United States Patent [19]
Gall

[11] 3,907,821
[45] Sept. 23, 1975

[54] 2-[3-[1-(DIMETHYLAMINO)CYCLOPROPYL[-4H-1,2,4-TRIAZOL-4-YL[ BENZOPHENONE

[75] Inventor: Martin Gall, Kalamazoo, Mich.

[73] Assignee: The Upjohn Company, Kalamazoo, Mich.

[22] Filed: Nov. 20, 1974

[21] Appl. No.: 525,362

[52] U.S. Cl. .............................. 260/308 R; 424/269
[51] Int. Cl.² ........................................ C07D 249/08
[58] Field of Search ................................ 260/308 R

[56] References Cited
UNITED STATES PATENTS
3,813,412   5/1974   Gall et al. ...................... 260/308 R OTHER PUBLICATIONS
Gall, U.S. application 387,761 published under Trial Voluntary Protest Program 1/28/75.

Primary Examiner—Alton D. Rollins
Attorney, Agent, or Firm—Hans L. Berneis

[57] ABSTRACT
Compounds of the formula II

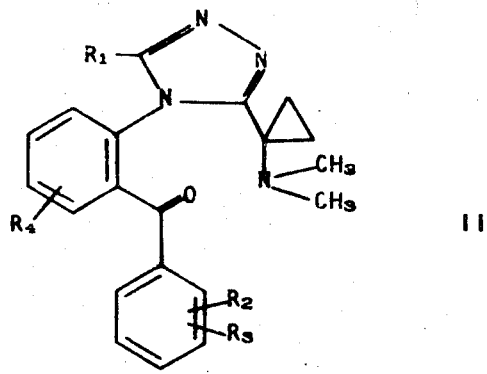

wherein $R_1$ is hydrogen, methyl, (dimethylamino)methyl or hydroxymethyl; wherein $R_2$ is hydrogen, chloro, or fluoro; wherein $R_3$ is hydrogen or fluoro with the proviso that $R_3$ is not fluoro if $R_2$ is chloro; and wherein $R_4$ is hydrogen, chloro, fluoro, bromo, nitro, or trifluoromethyl; are obtained by treating a compound of formula I:

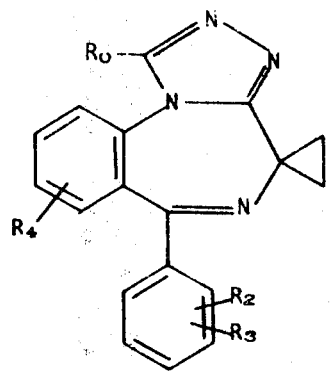

wherein $R_2$, $R_3$, and $R_4$ are defined as above and $R_o$ is hydrogen, methyl or (dimethylamino)methyl with formaldehyde in aqueous formic acid to obtain a compound of formula II.

The compounds of formula II and the pharmacologically accepted salts thereof have sedative, tranquilizing and anti-anxiety activity and can be used in mammals (including humans) and birds to produce a state of tranquility.

13 Claims, No Drawings

2-[3-[1-(DIMETHYLAMINO)CYCLOPROPYL]-4H-1,2,4-TRIAZOL-4-YL]BENZOPHENONE

BACKGROUND OF THE INVENTION

Field of the Invention

This invention is directed to organic compounds and is particularly concerned with a 2-[3-[1-(dimethylamino cyclopropyl]-5-substituted-4H-1,2,4-triazol-4-yl]benzophenone.

The new compounds and the process of production therefor can be illustratively represented as follows:

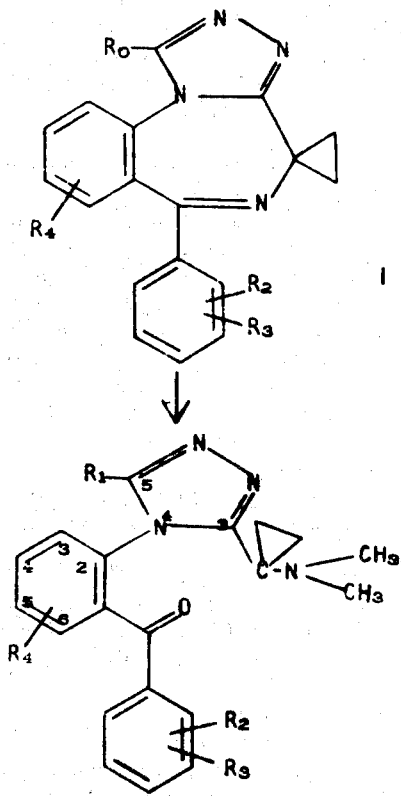

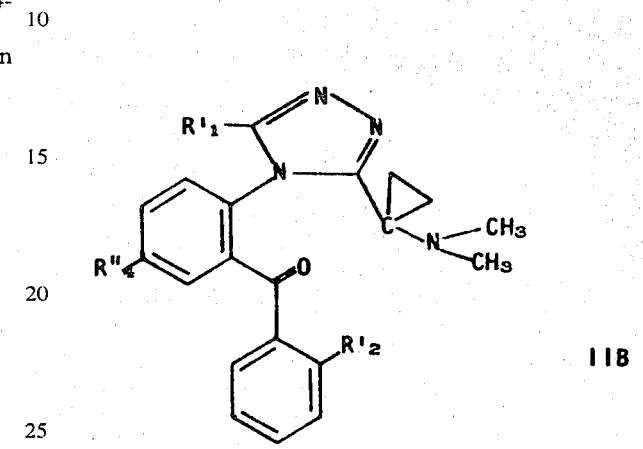

wherein $R_0$ is hydrogen, methyl or (dimethylamino)methyl; wherein $R_1$ is hydrogen, methyl, (dimethylamino)methyl or hydroxymethyl; wherein $R_2$ is hydrogen, chloro, or fluoro; wherein $R_3$ is hydrogen or fluoro with the proviso that $R_3$ is not fluoro if $R_2$ is chloro; and wherein $R_4$ is hydrogen, chloro, fluoro, bromo, nitro, or trifluoromethyl. This invention also includes the pharmacologically acceptable acid addition salts of compounds II.

The more desirable compounds of this invention are of the formula IIA:

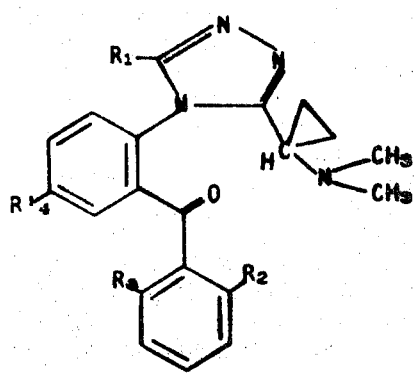

wherein $R_1$ is hydrogen, methyl, (dimethylamino)methyl or hydroxymethyl; wherein $R_2$ is hydrogen, chloro, or fluoro; wherein $R_3$ is hydrogen, or fluoro with the proviso that $R_3$ is not fluoro if $R_2$ is chloro; wherein $R'_4$ is hydrogen, chloro, fluoro, or trifluoromethyl and the pharmacologically acceptable acid addition salts thereof.

The most desirable compounds of this invention are of the formula IIB:

wherein $R'_1$ is hydrogen, methyl or (dimethylamino)methyl; wherein $R'_2$ is hydrogen or chloro; wherein $R''_4$ is hydrogen or chloro; and the pharmacologically acceptable acid addition salts thereof.

The process of this invention comprises: heating in aqueous formic acid a compound of formula I with formaldehyde to obtain a compound of formula II.

The compound II in which $R_1$ is desired to be hydrogen is obtained by either heating compound I in which $R_0$ is hydrogen, for ½ hour, or heating such compound I with only 2 equivalents of formaldehyde.

The compound of formula II in which $R_1$ is hydroxymethyl is obtained by heating a compound of formula I in which $R_0$ is hydrogen for 15 to 48 hours with three or more equivalents of formaldehyde.

DESCRIPTION OF THE PREFERRED EMBODIMENT

The compounds of formula II (including the preferred species IIA and IIB) and the pharmacologically acceptable acid addition salts thereof are sedatives, tranquilizers and anti-anxiety agents which are useful in mammals and birds.

The acid addition salts of compounds of formula II contemplated by this invention, are the hydrochlorides, hydrobromides, hydriodides, sulfates, phosphates, tartrates, lactates, citrates, cyclohexanesulfamates, methanesulfonates, toluenesulfonates and the like, prepared by reacting a compound of formula II with an excess of the selected pharmacologically acceptable acid.

Sedative effects of 2',5-dichloro-2-[3-[1-(dimethylamino)cyclopropyl]-5-methyl-4H-1,2,4-triazol-4-yl]benzophenone were determined in mice by the following tests:

Chimney test: [Med. Exp. 4, 145 (1961)]: The test determines the ability of mice to back up and out of a vertical glass cylinder within 30 seconds. At the effective dosage 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of the test compound at which 50% of the mice remain in the dish.

Pedestal test: The untreated mouse leaves the pedestal in less than a minute to climb back to the floor of the standard mouse box. Tranquilized mice will stay on the pedestal for more than 1 minute. The $ED_{50}$ is the dosage at which 50% are on the pedestal after 1 minute.

Nicotine antagonism test: Mice in a group of 6 are injected with the test compound. Thirty minutes later the mice including control (untreated) mice are injected with nicotine salicylate (2 mg./kg.). The control mice show overstimulation, i.e., (1) running convulsions followed by (2) tonic extensor fits followed by (3) death. The $ED_{50}$ is the dosage of the test compound at which 50% of the mice are protected against (2) and (3).

The pharmaceutical forms contemplated by this invention include pharmaceutical compositions suited for oral, parenteral, and rectal use, e.g., tablets, and powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water and oils, e.g., coconut oil, sesame oil, safflower oil, cottonseed oil, peanut oil may be used for preparing solutions or suspensions of the active drug. Sweetening, coloring, and flavoring agents may be added.

For mammals and birds, food premixes, with starch, oatmeal, dried fishmeat, fishmeal, flour and the like can be prepared.

As tranquilizers, the compounds of formula I can be used in unit dosages of 0.01 to 2.0 mg./kg. in oral or injectable preparations as described above, to alleviate tension and anxiety in mammals, or birds, such as e.g., occurs when animals are in travel.

The starting materials of formula I of this invention are prepared by the methods disclosed in the preparation.

In carrying out the process of the present invention selected starting compound of formula I is heated in aqueous formic acid with formaldehyde between 50°–100°C. In the preferred embodiment of this reaction the starting material (1 mole equivalent) in 5–20 mole equivalents of the aqueous formalin and 5–15 mole equivalents of formic acid is heated to about reflux temperature (100° C.). The formic acid is generally used in 88% strength and the formalin is preferably aqueous 37% formaldehyde. The time of reaction at reflux temperature is from ½ to 3 hours. When a compound of formula II with $R_1$ is hydrogen is wanted the reaction is carried out in ½ hour or with merely 2 equivalents of formaldehyde. If a compound II in which $R_1$ is hydroxymethyl is desired, 3 or more equivalents of formaldehyde and a reaction time of 15 to 48 hours is necessary. At the termination of the reaction the end product II is isolated and purified by conventional means, e.g. neutralizing the reaction mixture, extraction, chromatography and crystallization.

The following Preparations and Examples are illustrative of the products and processes of this invention, but are not to be construed as limiting. Preparation 1 8-Chloro-4-lithio-1-methyl-6-(o-chlorophenyl)-4H-s-triazolo[4,3-a][1,4]benzodiazepine To a solution of 49.6 mmole of methyl lithium in 40 ml. of 1,2-dimethoxyethane at −60° C., 6.08 g. (60 mml) of diisopropylamine is added and the solution stirred for 15 minutes. To this is added 40 mmol of 8-chloro-1-methyl-6-(o-chlorophenyl)-4H-s-triazolo[4,3-a][1,4]benzodiazepine in 40 ml. of 1,2-dimethoxyethane and 120 ml. of tetrahydrofuran. The mixture is stirred overnight (20 hours) while warming up to room temperature 22°–24° C. This reaction mixture containing 8-chloro-4-lithio-1-methyl-6-(o-chlorophenyl)-4H-s-triazolo[4,3-a][1,4]benzodiazepine is used in the next step. Preparation 2 8-Chloro-4-(2-chloroethyl)-1-methyl-6-(o-chlorophenyl)-4H-s-triazolo[4,3-a][1,4]benzodiazepine To the solution of 8-chloro-4-lithio-1-methyl-4H-s-triazolo[4,3-a][1,4]benzodizepine (Preparation 1) is added about 200 mmole (28.8 g) of 1-chloro-2-bromoethane. The resulting mixture is stirred overnight, poured into ice-water and extracted with chloroform. The chloroform extract is dried over anhydrous sodium sulfate, concentrated in vacuo to an oil, chromatographed over silica gel by eluting with methanol/chloroform mixtures. After discarding a 1 liter forerun, fractions 11–25 are crystallized to give 8-chloro-4-(2-chloroethyl)-1-methyl-4H-s-triazolo-[4,3-a][1,4]benzodiazepine.

The analytical sample of 8-chloro-4-(2-chloroethyl)-1-methyl-4H-s-triazolo[4,3-a][1,4]benzodiazepine has a melting point of 197° to 198° C. Anal. Calcd. for $C_{19}H_{15}Cl_3N_4$, mw 405.70; C, 56.25; H 3.75; N, 13.81; Cl, 26.21. Found: C, 56.32; H, 3.87; N, 13.66; Cl, 26.07. Preparation 3 8'-Chloro-6'-(o-chlorophenyl)-1'-methylspiro[cyclopropane-1,4'-[4H]-s-triazolo[4,3-a] [1,4]benzodiazepine]

8-Chloro-4-(2-chloroethyl)-1-methyl-6-(o-chlorophenyl)-4H-s-triazolo[4,3-a][1,4]benzodiazepine (4.05 g, 10.0 mmol) dissolved in 10 ml. of dry tetrahydrofuran is added slowly to a cold (−40° to 10° C.) solution of 12.0 mmol of butyl lithium in tetrahydrofuran. The solution is stirred for 1 hour while warming to room temperature and then poured onto ice, made basic with a 15% aqueous sodium hydroxide solution and extracted with chloroform. The combined chloroform layers are dried over anhydrous sodium sulfate, concentrated in vacuo to an oil, chromatographed over silica gel by eluting with methanol/chloroform mixtures, and after discarding a 1 liter forerun fraction 30–48 are crystallized to give 8'-chloro-6'-(o-chlorophenyl)-1'-methylspiro[cyclopropane-1,4'-[4H]-s-triazolo[4,3-a][1,4]benzodiazepine] of melting point 199°–202.5° C. Anal. Calcd. for $C_{19}H_{14}Cl_2N_4$, mw 369.24; C, 61.80; H, 3.82; N, 15.18; Cl, 19.20. Found: C, 61.58; H, 3.69; N, 15.04; Cl, 19.20. Preparation 4 1-Methyl-4-(2-chloroethyl)-6-phenyl-8-chloro-4H-s-triazolo[4,3-a][1,4]benzodiazepine 49.6 mmol of methyllithium in 40 ml. of 1,2-dimethoxyethane at −60° C. is treated with 6.08 g. (60.0 mmole) of diisopropylamine and stirred ¼ hour. To it is added a slurry of 12.35 g. (40.0 mmol) of 8-chloro-1-methyl-6-phenyl-4H-s-triazolo[4,3-a[]1,4]benzodiazepine in a mixture of 40 ml. of 1,2-dimethoxyethane and 120 ml. of hot tetrahydrofuran.

The reaction mixture is stirred for ½ hour at −60° C. then treated with 22.94 g. (160.0 mmol) of 1-chloro-2-bromoethane. The resulting mixture is stirred overnight while warming to room temperature. The resulting mixture is poured into ice-water and extracted with chloroform. The chloroform extract is dried over anhydrous sodium sulfate, concentrated in vacuo to an oil, chromatographed over silica gel by eluting with methanol/chloroform mixtures and crystallized. The thus obtained 8-chloro-4-(2-chloroethyl)-1-methyl-6-phenyl-4H-s-triazolo[4,3-a][1,4]-benzodiazepine has a melting point of 205°–209° C. Anal. calcd. for $C_{19}H_{16}Cl_2N_4$, mw 371.26; C, 61.46; H, 4.34; N, 15.09; Cl, 19.10. Found: C, 61.39; H, 4.63; N, 15.00; Cl, 18.81. Preparation 5 8'-Chloro-1'-methyl-6'-phenylspiro[cyclopropane-1,4'-[4H]-s-triazolo[4,3-a][1,4]benzodizepine In the manner given in Preparation 3, 8-chloro-1-methyl-4-(2-chloroethyl)-6-phenyl-4H-s-triazolo[4,3-a]-[1,4]benzodiazepine in tetrahydrofuran is treated with butyl lithium to give 8'-chloro-1'-methyl-6'-phenylspiro-[cyclopropane-1,4'-[4H]-s-triazolo[4,3-a][1,4]benzodiazepine]. Preparation 6 8-Chloro-4-lithio-6-(o-chlorophenyl)-4H-s-triazolo[4,3-a][1,4]benzodiazepine In the manner given in Prepration 1, 8-chloro-6-(o-chlorophenyl)-4H-s-triazolo[4,3-a][1,4]benzodiazepine in tetrahydrofuran is reacted with lithium diisopropylamide, prepared in situ, to give 8-chloro-4-lithio-6-(o-chlorophenyl)-4H-s-triazolo[4,3-a][1,4]benzodiazepine in solution. Preparation 7 8-Chloro-4-(2-chloroethyl)-6-(o-chlorophenyl)-4H-s-triazolo[4,3-a][1,4]benzodiazepine In the manner given in Preparation 2, the solution of 8-chloro-4-lithio-6-(o-chlorophenyl)-4H-s-triazolo[4,3-a]-[1,4]benzodiazepine is reacted with 1-chloro-2-bromoethane to give 8-chloro-4-(2-chloroethyl)-6-(o-chlorophenyl)-4H-s-triazolo[4,3-a][1,4]benzodiazepine. Preparation 8 8'-Chloro-6'-(o-chlorophenyl)spiro[cyclopropane-propane-1,4'-[4H]-s-triazolo[4,3-][1,4-benzodiazepine]

In the manner given in Preparation 3, 8-chloro-4-(2-chloroethyl)-6-(o-chlorophenyl)-4H-s-triazolo[4,3-a]-[1,4]benzodiazepine in tetrahydrofuran is reacted with butyl lithium to give 8'-chloro-6'-(o-chlorophenyl)spiro-[cyclopropane-1,4'-(4H)-s-triazolo[4,3-a][1,4]benzodiazepine]. Preparation 9 8-Nitro-1-methyl-4-lithio-6-(o-chlorophenyl)-4H-s-triazolo[4,3-a][1,4]benzodiazepine In the manner given in Preparation 1, 8-nitro-1-methyl-6-(o-chlorophenyl)-4H-s-triazolo[4,3-a][1,4]benzodiazepine in tetrahydrofuran is reacted with lithium diisopropylamide, prepared in situ, to give 8-nitro-1-methyl-4-lithio-6-(o-chlorophenyl)-4H-s-triazolo[4,3-a][1,4]benzodiazepine in solution. Preparation 10 8-Nitro-1-methyl-4-(2-chloroethyl)-6-(o-chlorophenyl)-4H-s-triazolo[4,3-a][1,4]benzodizepine In the manner given in Preparation 2, the solution of 8-nitro-1-methyl-4-lithio-6-(o-chlorophenyl)-4H-s-triazolo-[4,3-a][1,4]benzodiazepine is reacted with 1-chloro-2-bromoethane to give 8-nitro-1-methyl-4-(2-chloroethyl)-6-(o-chlorophenyl)4H-s-triazolo[4,3-a][1,4]benzodiazepine. Preparation 11 8'-Nitro-1'-methyl-6'-(o-chlorophenyl)-spiro[cyclopropane-1,4'-[4H]-s-triazolo[4,3-a][1,4]benzodiazepine]

8-nitro-1-methyl-4-(2-chloroethyl)-6-(o-chlorophenyl)-4H-s-triazolo[4,3-a][1,4]benzodiazepine in tetrahydrofuran is reacted with potassium hydride to give 8'-nitro-1'-methyl-6'-(o-chlorophenyl)spiro[cyclopropane-1,4'-[4H]-s-triazolo[4,3-a][1,4]benzodiazepine]. Preparation 12 8-Chloro-1-methyl-4-lithio-6-(2,6-difluorophenyl)-4H-s-triazolo[4,3-a][1,4]benzodiazepine In the manner given in Preparation 1, 8-chloro-1-methyl-6-(2,6-difluorophenyl)-4H-s-triazolo[4,3-a][1,4]-benzodiazepine in tetrahydrofuran is reacted with lithium diisopropylamide, prepared in situ, to give 8-chloro-1-methyl-4-lithio-6-(2,6-difluorophenyl)-4H-s-triazolo-[4,3-a][1,4]benzodiazepine in solution. Preparation 13 8-Chloro-1-methyl-4-(2-chloroethyl)-6-(2,6-difluorophenyl)-4H-s-triazolo[4,3-a][1,4]benzodiazepine In the manner given in Preparation 2, the solution of 8-chloro-1-methyl-4-lithio-6-(2,6-difluorophenyl)-4H-s-triazolo[4,3-a][1,4]benzodiazepine is reacted with 1-chloro-2-bromoethane to give 8-chloro-1-methyl-4-(2-chloroethyl)-6-(2,6-difluorophenyl)-4H-s-triazolo[4,3-a][1,4]-benzodiazepine. Preparation 14 8'-Chloro-1'-methyl-6'-(2,6-difluorophenyl)-spiro[cyclopropane-1,4'-[4H]-s-triazolo[4,3-a][1,4-benzodiazepine]

In the manner given in Preparation 3, 8-chloro-1-methyl-4-(2-chloroethyl)-6-(2,6-difluorophenyl)-4H-s-triazolo-[4,3-a][1,4]benzodiazepine in tetrahydrofuran is reacted with butyl lithium to give 8'-chloro-1'-methyl-6'-(2,6-difluorophenyl)spiro[cyclopropane-1,4'-[4H]-s-triazolo-[4,3-a][1,4]benzodiazepine]. Preparation 15 8-Fluoro-1-methyl-4-lithio-6-(o-chlorophenyl)-4H-s-triazolo[4,3-a][1,4]benzodiazepine In the manner given in Preparation 1, 8-fluoro-1-methyl-6-(o-chlorophenyl)-4H-s-triazolo[4,3-a][1,4]benzodiazepine in tetrahydrofuran is reacted with lithium diisopropylamide, prepared in situ, to give 8-fluoro-1-methyl-4-lithio-6-(o-chlorophenyl)-4H-s-triazolo[4,3-a][1,4]benzodiazepine in solution. Preparation 16 8-Fluoro-1-methyl-4-(2-chloroethyl)-6-(o-chlorophenyl)-4H-s-triazolo[4,3-a][1,4]benzodiazepine In the manner given in Preparation 2, the solution of 4-fluoro-1-methyl-4-lithio-6-(o-chlorophenyl)-4H-s-triazolo-[4,3-a][1,4]benzodiazepine is reacted with 1-chloro-2-bromoethane to give 8-fluoro-1-methyl-4-(2-chloroethyl)-6-(o-chlorophenyl)-4H-s-triazolo[4,3-a][1,4]benzodiazepine. Preparation 17 8'-Fluoro-1'-methyl-6'-(o-chlorophenyl)-spiro[cyclopropane-1,4'-[4H]-s-triazolo[4,3-a][1,4]benzodiazepine]

In the manner given in Preparation 3, 8-fluoro-1-methyl-4-(2-chloroethyl)-6-(o-chlorophenyl)-4H-s-triazolo-[4,3-a][1,4]benzodiazepine in tetrahydrofuran is reacted with butyl lithium to give 8-fluoro-1'-methyl-6'-(o-chlorophenyl)spiro[cyclopropane-1,4'-[4H]-s-triazolo[4,3-a][1,4]-benzodiazepine]. Preparation 18 1-Methyl-4-lithio-6-(o-chlorophenyl)-4H-s-triazolo[4,3-a][1,4]benzodiazepine In the manner given in Preparation 1, 1-methyl-6-(o-chlorophenyl)-4H-s-triazolo[4,3-a][1,4]benzodiazepine in tetrahydrofuran is reacted with lithium diisopropylamide prepared in situ, to give 1-methyl-4-lithio-6-(o-chlorophenyl)-4H-s-triazolo[4,3-a][1,4]benzodiazepine in solution. Preparation 19 1-Methyl-4-(2-chloroethyl)-6-(o- chlorophenyl)-4H-s-triazolo[4,3-a][1,4]benzodiazepine

In the manner given in Preparation 2, the solution of 1-methyl-4-lithio-6-(o-chlorophenyl)-4H-s-triazolo[4,3-a]-[1,4]benzodiazepine is reacted with 1-chloro-2-bromoethane to give 1-methyl-4-(2-chloroethyl)-6-(o-chlorophenyl)-4H-s-triazolo[4,3-a][1,4]benzodiazepine. Preparation 20 1'-Methyl-6'-(o-chlorophenyl)spiro[cyclopropane-1,4'-[4H]-s-triazolo[4,3-a][1,4]benzodiazepine]

In the manner given in Preparation 3, 1-methyl-4-(2-chloroethyl)-6-(o-chlorophenyl)-4H-s-triazolo[4,3-a]-[1,4]benzodiazepine in tetrahydrofuran is reacted with butyl lithium to give 1'-methyl-6'-(o-chlorophenyl)spiro-[cyclopropane-1,4'-[4H]-s-triazolo[4,3-a][1,4]benzodiazepine]. Preparation 21 8-fluoro-1-methyl-4-lithio-6-phenyl-4H-s-triazolo[4,3-a][1,4]benzodiazepine In the manner given in Preparation 1, 8-fluoro-1-methyl-6-phenyl-4H-s-triazolo[4,3-a][1,4]benzodiazepine in tetrahydrofuran is reacted with lithium diisopropylamide, prepared in situ, to give 8-fluoro-1-methyl-4-lithio-6-phenyl-4H-s-triazolo[4,3-a][1,4]benzodiazepine in solution. Preparation 22 8-Fluoro-1-methyl-4-(2-chloroethyl)-6-phenyl-4H-s-triazolo[4,3-a][1,4]benzodiazepine In the manner given in Preparation 2, the solution of 8-fluoro-1-methyl-4-lithio-6-phenyl-4H-s-triazolo[4,3-a]-[1,4]benzodiazepine is reacted with 1-chloro-2-bromoethane to give 8-fluoro-1-methyl-4-(2-chloroethyl)-6-phenyl-4H-s-triazolo[4,3-a][1,4]benzodiazepine. Preparation 23 8'-Fluoro-1'-methyl-6'-phenylspiro[cyclopropane-1,4'-[4H]-s-triazolo[4,3-a][1,4]benzodiazepine]

In the manner given in Preparation 3, 8-fluoro-1-methyl-4-(2-chloroethyl)-6-phenyl-4H-s-triazolo[4,3-a]-[1,4]benzodiazepine in tetrahydrofuran is reacted with butyl lithium to give 8'-fluoro-1'-methyl-6'-phenylspiro[cyclopropane-1,4'-[4H]-s-triazolo[4,3-a][1,4]benzodiazepine]. Preparation 24 8-Chloro-4-lithio-1-[(dimethylamino)methyl]-6-phenyl-4H-s-triazolo[4,3-a][1,4]benzodiazepine To a suspension of 8-chloro-1-[(dimethylamino)methyl]-6-phenyl-4H-s-triazolo[4,3-a][1,4]benzodiazepine (3.09 g. 10 mmol) in 50 ml. of distilled tetrahydrofuran is added 10 mmole of butyllithium in tetrahydrofuran. The mixture is stirred for 1 hour at 5° to 10° C. to produce 8-chloro-4-lithio-1-[(dimethylamino)methyl]-6-phenyl-4H-s-triazolo-[4,3-a][1,4]benzodiazepine. Preparation 25 8-Chloro-1-[(dimethylamino)methyl]-4-(2-chloroethyl)-6-phenyl-4H-s-triazolo[4,3-a][1,4]benzodiazepine In the manner given in Preparation 2, the solution of 8-chloro-1-[(dimethylamino)methyl]-4-lithio-6-phenyl-4H-s-triazolo[4,3-a][1,4]benzodiazepine is reacted with 1-chloro-2-bromoethane to give 8-chloro-1-[(dimethylamino)-methyl]-4-(2-chloroethyl)-6-phenyl-4H-s-triazolo[4,3-a]-[1,4]benzodiazepine of melting point 160°–162° C. Anal. calcd. for $C_{21}H_{21}Cl_2N_5$: C, 60.87; H, 5.11; N, 16.91; Cl, 17.11. Found: C, 60.88; H, 5.12; N, 16.81; Cl, 17.07. Preparation 26 8'-Chloro-1'-[(dimethylamino)methyl]-6'-phenylspiro[cyclopropane-1,4'-[4H]-s-triazolo[4,3-a]-[1,4]benzodiazepine]

In the manner given in Preparation 3, 8-chloro-1-[(dimethylamino)methyl]-4-(2-chloroethyl)-6-phenyl-4H-s-triazolo[4,3-a][1,4]benzodiazepine in tetrahydrofuran is reacted with butyl lithium to give 8'-chloro-1'-[(dimethylamino)methyl]-6'-phenylspiro[cyclopropane-1,4'-[4H]-s-triazolo[4,3-a][1,4]benzodiazepine] of melting point 199°–201° C. Anal. calcd. for $C_{21}H_{20}N_5Cl$: C, 66.74; H, 5.34; N, 18.54; Cl, 9.38. Found: C, 66.50; H, 5.49; N, 18.49; Cl, 9.31. Preparation 27 8-Chloro-1-[(dimethylamino)methyl]-4-lithio-6-(o-chlorophenyl)-4H-s-triazolo[4,3-a][1,4]-benzodiazepine In the manner given in Preparation 1, 8-chloro-1-[(dimethylamino)methyl]-6-(o-chlorophenyl)-4H-s-triazolo-[4,3-a][1,4]benzodiazepine in tetrahydrofuran is reacted with lithium diisopropylamide, prepared in situ, to give 8-chloro-1-[(dimethylamino)methyl]-4-lithio-6-phenyl-4H-s-triazolo[4,3-a][1,4]benzodiazepine in solution. Preparation 28 8-Chloro-1-[(dimethylamino)methyl]-4-(2-chloroethyl)-6-(o-chlorophenyl)-4H-s-triazolo[4,3-a][1,4]-benzodiazepine In the manner given in Preparation 2, the solution of 8-chloro-1-[(dimethylamino)methyl]-4-lithio-6-(o-chlorophenyl)-4H-s-triazolo[4,3-a][1,4]benzodiazepine is reacted with 1-chloro-2-bromoethane to give 8-chloro-1-[(dimethylamino)methyl]-4-(2-chloroethyl)-6-(o-chlorophenyl)-4H-s-triazolo[4,3-a][1,4]benzodiazepine of melting point 173°–175° C. Preparation 29 8'-Chloro-1'-[(dimethylamino)methyl]-6'-(o-chlorophenyl)spiro[cyclopropane-1,4'-[4H]-s-triazolo-[4,3-a][1,4]benzodiazepine]

In the manner given in Preparation 3, 8-chloro-1-[(dimethylamino)methyl]-4-(2-chloroethyl)-6-(o-chlorophenyl)-4H-s-triazolo[4,3-a][1,4]benzodiazepine in tetrahydrofuran is reacted with butyl lithium to give 8'-chloro-1'-[(dimethylamino)methyl]-6'-(o-chlorophenyl)spiro[cyclopropane-1,4'-[4H]-s-triazolo[4,3-a][1,4]benzodiazepine] of melting point 273°–275° C.

In the manner given in the preceding Preparations other 1'-substituted or unsubstituted-6'-phenylspiro-[cyclopropane-1,4'-[4H]-s-triazolo[4,3-a][1,4]benzodiazepines] of formula I can be synthesized. Compounds thus obtained include:

7'-chloro-1'-[(dimethylamino)methyl]-6'-(o-fluorophenyl)-spiro[cyclopropane-1,4'-[4H]-s-triazolo[4,3-a][1,4]-benzodiazepine];

9'-bromo-1'-[(dimethylamino)methyl]-6'-phenylspiro[cyclopropane-1,4'-[4H]-s-triazolo[4,3-a][1,4]benzodiazepine];

10'-(trifluoromethyl)-1'-methyl-6'-(o-chlorophenyl)spiro-[cyclopropane-1,4'-[4H]-s-triazolo[4,3-a][1,4]benzodiazepine];

9'-(trifluoromethyl)-1'-methyl-6'-(m-chlorophenyl)spiro-[cyclopropane-1,4'-[4H]-s-triazolo[4,3-a][1,4]benzodiazepine];

8'-chloro-6'-(m-fluorophenyl)spiro[cyclopropane-1,4'-[4H]-s-triazolo[4,3-a][1,4]benzodiazepine];

8'-(trifluoromethyl)-1-[(dimethylamino)methyl]-6'-(o-chlorophenyl)spiro[cyclopropane-1,4'-[4H]-s-triazolo[4,3-a][1,4]-benzodiazepine];

9'-fluoro-1'-methyl-6'-(2,6-difluorophenyl)spiro[cyclopropane-1,4'-[4H]-s-triazolo[4,3-a][1,4]benzodiazepine];

10'-bromo-6'-(2,6-difluorophenyl)spiro[cyclopropane-1,4'-[4H]-s-triazolo[4,3-a][1,4]benzodiazepine];

10'-fluoro-1'-methyl-6'-(p-fluorophenyl)spiro[cyclopropane-1,4'-[4H]-s-triazolo[4,3-a][1,4]benzodiazepine];

9'-nitro-1'-[(dimethylamino)methyl]-6'-phenylspiro[cyclopropane-1,4'-[4H]-s-triazolo[4,3-a][1,4]benzodiazepine];

7'-nitro-1'-[(dimethylamino)methyl]-6'-(o-chlorophenyl)-spiro[cyclopropane-1,4'-[4H]-s-triazolo[4,3-a][1,4]-benzodiazepine];

8'-nitro-1'-[(dimethylamino)methyl]-6'-(o-chlorophenyl)-spiro[cyclopropane-1,4'-[4H]-s-triazolo[4,3-a][1,4]-benzodiazepine];

1'-[(dimethylamino)methyl]-6'-phenylspiro[cyclopropane-1,4'-[4H]-s-triazolo[4,3-a][1,4]benzodiazepine];

1'-[(dimethylamino)methyl]-6'-(o-chlorophenyl)spiro-[cyclopropane-1,4'-[4H]-s-triazolo[4,3-a][1,4]benzodiazepine];

6'-(o-chlorophenyl)spiro[cyclopropane-1,4'-[4H]-s-triazolo-[4,3-a][1,4]benzodiazepine]; and the like.

Example 1

2',5-Dichloro-2-[3-[1-(dimethylamino)cyclopropyl]-5-methyl-4H-1,2,4-triazol-4-yl]benzophenone A mixture of 0.369 g. (1.00 mmol) of 8'-chloro-1'-methyl-6'-(o-chlorophenyl)spiro[cyclopropane-1,4'-[4H]-s-triazolo[4,3-a][1,4]benzodiazepine], 1.31 g. (15.0 mmol) of 88% formic acid and 0.675 g. (9.0 mmol) of a 37% formalin solution are heated to 100° C. for 1 hour in an oil bath. The reaction mixture is cooled to room temperature and quenched in a cold (5°–10°) aqueous 5% sodium hydroxide solution, extracted with chloroform, dried over anhydrous sodium sulfate and concentrated to an oil in vacuo. Crystallization from ethyl acetate-hexane mixtures affords 260 mg. (62.7%) of 2',5-dichloro-2-[3-[1-(dimethylamino)-cyclopropyl]-5-methyl-4H-1,2,4-triazol-4-yl]benzophenone of melting point 150°–158° C. Anal. calcd. for $C_{21}H_{20}ClN_4$: C, 60.73; H, 4.85; N, 13.49; Cl, 17.07. Found: C, 60.73; H, 4.97; N, 13.87; Cl, 17.14.

Example 2

5-Chloro-2-[3,-[1-(dimethylamino)cyclopropyl]-5-methyl-4H-1,2,4-triazol-4-yl]benzophenone In the manner given in Example 1, 8'-chloro-1'-methyl-6'-phenylspiro[cyclopropane-1,4'-[4H]-s-triazolo-[4,3-a][1,4]benzodiazepine] is heated to reflux in formic acid with formalin to give 5-chloro-2-[3[1-(dimethylamino)-cyclopropyl]-5-methyl-4H-1,2,4-triazol-4-yl]benzophenone.

Example 3

2'-Chloro-5-nitro-2-[3-[1-(dimethylamino)-cyclopropyl]-5-methyl-4H-1,2,4-triazol-4-yl]benzophenone In the manner given in Example 1, 8'-nitro-1'-methyl-6'-(o-chlorophenyl)spiro[cyclopropane-1,4'-[4H]-s-triazolo-[4,3-a][1,4]benzodiazepine]is heated to reflux in formic acid with formalin to give 2'-chloro-5-nitro-2-[3-[1-(dimethylamino)cyclopropyl]-5-methyl-4H-1,2,4-triazol-4-yl]-benzophenone.

Example 4

2'-Chloro-2-[3-[1-(dimethylamino)cyclopropyl]-5-methyl-4H-1,2,4-triazol-4-yl]benzophenone In the manner given in Example 1, 6'-(o-chlorophenyl)-spiro[cyclopropane-1,4'-[4H]-s-triazolo-[4,3-a][1,4]benzodiazepine] is heated to reflux in formic acid with formalin to give 2'-chloro-2-[3-[1-(dimethylamino)cyclopropyl]-5-methyl-4H-1,2,4-triazol-4-yl]benzophenone.

Example 5

2'-Chloro-5-(trifluoromethyl)-2-[3-[1-(dimethylamino)cyclopropyl]-5-methyl-4H-1,2,4-triazol-4-yl]benzophenone In the manner given in Example 1, 8'-(trifluoromethyl)-1'-methyl-6'-(o-chlorophenyl)spiro[cyclopropane-1,4'-[4H]-s-triazolo[4,3-a][1,4]benzodiazepine] is heated to reflux in formic acid with formalin to give 2'-chloro-5-(trifluoromethyl)-2-[3-[1-(dimethylamino)cyclopropyl]-5-methyl-4H-1,2,4-triazol-4-yl]benzophenone.

Example 6

5-Chloro-2',6'-difluoro-2-[3-[1-(dimethylamino)-cyclopropyl]-5-methyl-[4H]-1,2,4-triazol-4-yl]benzophenone In the manner given in Example 1, 8'-chloro-1'-methyl-6'-(2,6-difluorophenyl)spiro[cyclopropane-1,4'-[4H]-s-triazolo[4,3-a][1,4]benzodiazepine] is heated to reflux in formic acid with formalin to give 5-chloro-2',6'-difluoro-2-[3-[1-(dimethylamino)cyclopropyl]-5-methyl-4H-1,2,4-triazol-4-yl]benzophenone.

Example 7

2',5-dichloro-2-[3-[1-(dimethylamino)cyclopropyl]-4H-1,2,4-triazol-4-yl]benzophenone In the manner given in Example 1, 8'-chloro-6'-(o-chlorophenyl)spiro[cyclopropane-1,4'-[4H]-s-triazolo-[4,3-a][1,4]benzodiazepine] is heated to reflux in formic acid with formalin for ½ hour to give 2',-5-dichloro-2-[3-[1-(dimethylamino)cyclopropyl]-4H-1,2,4-triazol-4-yl]-benzophenone.

Example 8

2',5-dichloro-2-[3-[1-(dimethylamino)cyclopropyl]-5-(hydroxymethyl)-4H-1,2,4-triazol-4-yl]benzophenone 8'-chloro-6'-(o-chlorophenyl)spiro[cyclopropane-1,4'-[4H]-s-triazolo[4,3-a][1,4]benzodiazepine] is heated to reflux in formic acid with excess formalin for 24 hours to afford 2',5-dichloro-2-[3-[1-(dimethylamino)cyclopropyl]-5-(hydroxymethyl)-4H-1,2,4-triazol-4-yl]benzophenone.

Example 9

5-Fluoro-2'-chloro-2-[3-[1-(dimethylamino)-cyclopropyl]-5-methyl-4H-1,2,4-triazol-4-yl]benzophenone In the manner given in Example 1, 8'-fluoro-1'-methyl-6'-(o-chlorophenyl)spiro[cyclopropane-1,4'-[4H]-s-triazolo[4,3-a][1,4]benzodiazepine] is heated to reflux in formic acid with formalin to give 5-fluoro-2'-chloro-2-[3-[1-(dimethylamino)cyclopropyl]-5-methyl-4H-1,2,4-triazol-4-yl]benzophenone.

Example 10

5-Chloro-2-[3-[1-(dimethylamino)cyclopropyl]-5-[(dimethylamino)methyl]-4H-1,2,4-triazol-4-yl]benzophenone In the manner given in Example 1, 8'-chloro-1'-[(dimethylamino)methyl]-6'-phenylspiro[cyclopropane-1,4'-[4H]-s-triazolo[4,3-a][1,4]benzodiazepine] is heated to reflux in formic acid with formalin to give 5-chloro-2-[3-[1-(dimethylamino)cyclopropyl]-5-[(dimethylamino)methyl]-4H-1,2,4-triazoly-4-yl]benzophenone.

Example 11

2',5-Dichloro-2-[3-[1-(dimethylamino)cyclopropyl]-5-[(dimethylamino)methyl]-4H-1,2,4-triazol-4-yl]-benzophenone In the manner given in Example 1, 8'-chloro-1'-[(dimethylamino)methyl]-6'-(o-chlorophenyl)spiro[cyclopropane-1,4'-[4H]-s-triazolo[4,3-a][1,4]benzodiazepine] is heated to reflux in formic acid with formalin to give 2',5-dichloro-2-[3-[1-(dimethylamino)cyclopropyl]-5-[(dimethylamino)methyl]-4H-1,2,4-triazol-4-yl]benzophenone of melting point 168.5°–170° C. Anal. calcd for $C_{23}H_{25}Cl_2N_5O$: C, 60.26; H, 5.50; N, 15.28; Cl, 15.47 Found: C, 60.48; H, 5.64; N, 15.63; Cl, 15.16.

Example 12

4-Bromo-2'-chloro-2-[3-[1-(dimethylamino)-cyclopropyl]-5-methyl-4H-1,2,4-triazol-4-yl]benzophenone In the manner given in Examaple 1, 9'-bromo-1'-methyl-6'-(o-chlorophenyl)spiro[cyclopropane-1,4'-[4H]-s-triazolo-[4,3-a][1,4]benzodiazepine] is heated to reflux in formic acid with formalin to give 4-bromo-2'-chloro-2-[3-[1-(dimethylamino)cyclopropyl]-5-methyl-4H-1,2,4-triazol-4-yl]-benzophenone.

Example 13

5-Chloro-2'-fluoro-2-[3-[1-(dimethylamino)-cyclopropyl]-5-[(dimethylamino)methyl]-4H-1,2,4-triazol-4-yl]benzophenone In the manner given in Example 1, 8'-chloro-1'-[(dimethylamino)methyl]-6'-(o-fluorophenyl)spiro[cyclopropane-1,4'-[4H]-s-triazolo[4,3-a][1,4]benzodiazepine] is heated to reflux in formic acid with formalin to give 5-chloro-2'-fluoro-2-[3-[1-(dimethylamino)cyclopropyl]-5-[(dimethylamino)methyl]-4H-1,2,4-triazol-4-yl]benzophenone.

EXAMPLE 14

5-Chloro-2-[3-[1-(dimethylamino)cyclopropyl]-4H-1,2,4-triazol-4-yl]benzophenone

In the manner given in Example 1, 8'-chloro-6'-phenylspiro[cyclopropane-1,4'-[4H]-s-triazolo[4,3-a][1,4]-benzodiazepine] is heated to reflux in formic acid with formalin to give 5-chloro-2-[3-[1-(dimethylamino)cyclopropyl]-4H-1,2,4-triazol-4-yl]benzophenone.

Example 15

3-(Trifluoromethyl)-3'-chloro-2-[3-[1-(dimethylamino)cyclopropyl]-5-methyl-4H-1,2,4-triazol-4-yl]-benzophenone In the manner given in Example 1, 10'-(trifluoromethyl)-1'-methyl-6'-(m-chlorophenyl)spiro[cyclopropane-1,4'-[4H]-s-triazolo[4,3-a][1,4]benzodiazepine] is heated to reflux in formic acid with formalin to give 3-(trifluoromethyl)-3'-chloro-2-[3-[1-(dimethylamino)cyclopropyl]-5-methyl-4H-1,2,4-triazol-4-yl]benzophenone.

In the manner given in the preceding Examples, other 2-[3-[1-(dimethylamino)cyclopropyl]-4H-1,2,4-triazol-4-yl]-benzophenones of formula II can be prepared. Representative compounds, thus obtained, include:

6-bromo-2'-chloro-2-[3-[1-(dimethylamino)cyclopropyl]-5-methyl-4H-1,2,4-triazol-4-yl]benzophenone;

4-nitro-3'-fluoro-2-[3-[1-(dimethylamino)cyclopropyl]-5-methyl-4H-1,2,4-triazol-4-yl]benzophenone;

3-nitro-2'-chloro-2-[3-[1-(dimethylamino)cyclopropyl]-5-methyl-4H-1,2,4-triazol-4-yl]benzophenone;

3-bromo-3'-fluoro-2-[3-[1-(dimethylamino)cyclopropyl]-5-methyl-4H-1,2,4-triazol-4-yl]benzophenone;

3-chloro-3'-chloro-2-[3-[1-(dimethylamino)cyclopropyl]-5-methyl-4H-1,2,4-triazol-4-yl]benzophenone;

3-fluoro-2',6'-difluoro-2-[3-[1-(dimethylamino)cyclopropyl]-5-methyl-4H-1,2,4-triazol-4-yl]benzophenone;

2',6'-difluoro-2-[3-[1-(dimethylamino)cyclopropyl]-5-methyl-4H-1,2,4-triazol-4-yl]benzophenone;

5-chloro-2',6'-difluoro-2-[3-[1-(dimethylamino)cyclopropyl]-5-[(dimethylamino)methyl]-4H-1,2,4-triazol-4-yl]benzophenone;

4-chloro-2',6'-difluoro-2-[3-[1-(dimethylamino)cyclopropyl]-5-[(dimethylamino)methyl]-4H-1,2,4-triazol-4-yl]benzophenone;

6-chloro-4'-fluoro-2-[3-[1-(dimethylamino)cyclopropyl]-5-[(dimethylamino)methyl]-4H-1,2,4-triazol-4-yl]benzophenone;

5-nitro-2'-chloro-2-[3-[1-(dimethylamino)cyclopropyl]-5-(hydroxymethyl)-4H-1,2,4-triazol-4-yl]benzophenone;

6-(trifluoromethyl)-2'-chloro-2-[3-[1-(dimethylamino)cyclopropyl]-5-[(dimethylamino)methyl]-4H-1,2,4-triazol-4-yl]-benzophenone;

3-bromo-2'-fluoro-2-[3-[1-(dimethylamino)cyclopropyl]-5-[(dimethylamino)methyl]-4H-1,2,4-triazol-4-yl]benzophenone;

4-bromo-2'-chloro-2-[3-1-(dimethylamino)cyclopropyl]-5-[(dimethylamino)methyl]-4H-1,2,4-triazol-4-yl]benzophenone;

2'-chloro-2-[3-[1-

(dimethylamino)cyclopropyl]-4H-1,2,4-triazol-4-yl]benzophenone;

5-chloro-2-[3-[1-(dimethylamino)cyclopropyl]-5-(hydroxymethyl)-4H-1,2,4-triazol-4-yl]benzophenone; and the like.

Treating the compounds of formula II with a pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic acids, and the like produces the pharmacologically acceptable salts of these compounds of formula II which can be used like the free base compounds of formula II. Salt formation is achieved in conventional manner by reacting the compounds of formula II with excess of a selected acid in a suitable medium e.g. water, a lower alkanol, ether, or acetone and recovering the salt by evaporating the solvent, preferably in vacuo.

I claim:
1. A compound of the formula II

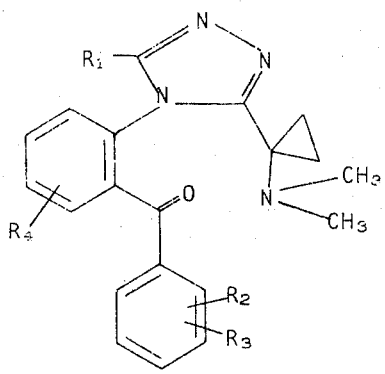

wherein $R_1$ is hydrogen, methyl, (dimethylamino)methyl or hydroxymethyl; wherein $R_2$ is hydrogen, chloro, or fluoro; wherein $R_3$ is hydrogen or fluoro with the proviso that $R_3$ is not fluoro, if $R_2$ is chloro; and wherein $R_4$ is hydrogen, chloro, fluoro, bromo, nitro, or trifluoromethyl; and the pharmacologically acceptable acid addition salts thereof.

2. A compound according to claim 1 of the formula IIA:

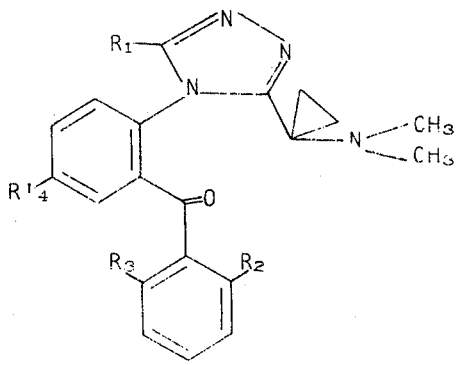

where $R_1$ is hydrogen, methyl, (dimethylamino)methyl or hydroxymethyl; wherein $R_2$ is hydrogen, chloro, or fluoro; wherein $R_3$ is hydrogen or fluoro with the proviso that $R_3$ is not fluoro, if $R_2$ is chloro; wherein $R'_4$ is hydrogen, chloro, fluoro, or trifluoromethyl; and the pharmacologically acceptable acid addition salts thereof.

3. A compound according to claim 1 of the formula IIB:

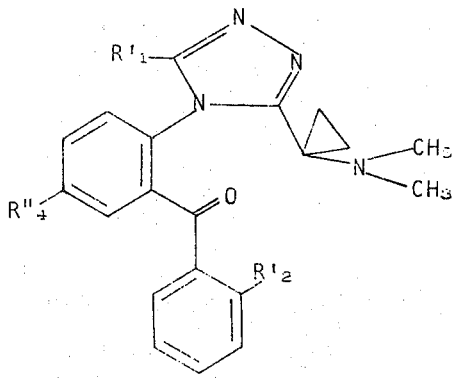

wherein $R'_1$ is hydrogen, methyl, or (dimethylamino)methyl; wherein $R'_2$ is hydrogen or chloro; wherein $R''_4$ is hydrogen or chloro; and the pharmacologically acceptable acid addition salts thereof.

4. A compound according to claim 3, wherein $R'_1$ is methyl, $R'_2$ is hydrogen, $R''_4$ is chloro, and the compound is therefore 5-chloro-2-[3-[1-(dimethylamino)cyclopropyl]-5-methyl-4H-1,2,4-triazol-4-yl]benzophenone.

5. A compound according to claim 3, wherein $R'_1$ is methyl, $R'_2$ and $R''_4$ are chloro, and the compound is therefore 2',5-dichloro-2-[3-[1-(dimethylamino)cyclopropyl]-5-methyl-4H-1,2,4-triazol-4-yl]benzophenone.

6. A compound according to claim 3, wherein $R'_1$ is hydrogen, $R'_2$ and $R''_4$ are chloro and the compound is therefore 2',5-dichloro-2-[3-[1-(dimethylamino)cyclopropyl]-4H-1,2,4-triazol-4-yl]benzophenone.

7. A compound according to claim 3, wherein $R'_1$ is methyl, $R'_2$ is chloro, $R''_4$ is hydrogen, and the compound is therefore 2'-chloro-2-[3-[1-(dimethylamino)cyclopropyl]-5-methyl-4H-1,2,4-triazol-4-yl]benzophenone.

8. A compound according to claim 3, wherein $R'_1$ and $R''_4$ are hydrogen, $R'_2$ is chloro, and the compound is therefore 2'-chloro-2-[3-[1-(dimethylamino)cyclopropyl]-4H-1,2,4-triazol-4-yl]benzophenone.

9. A compound according to claim 2, wherein $R_1$ is methyl, $R'_4$ is chloro, $R_2$ and $R_3$ are fluoro, and the compound is therefore 5-chloro-2',6'-difluoro-2-[3-[1-(dimethylamino)-cyclopropyl]-5-methyl-4H-1,2,4-triazol-4-yl]benzophenone.

10. A compound according to claim 3, wherein $R_1'$ is (dimethylamino)methyl, $R_2$ is hydrogen, $R''_4$ is chloro, and the compound is therefore 5-chloro-2-[3-[1-(dimethylamino)cyclopropyl]-5-[(dimethylamino)methyl]-4H-1,2,4-triazol-4-yl]benzophenone.

11. A compound according to claim 3, wherein $R_1'$ is [(dimethylamino)methyl], $R'_2$ and $R''_4$ are chloro, and the compound is therefore 2',5-dichloro-2-[3-[1-(dimethylamino)cyclopropyl]-5-[(dimethylamino)-methyl]-4H-1,2,4-triazol-4-yl]benzophenone.

12. A process for the production of a compound of formula:

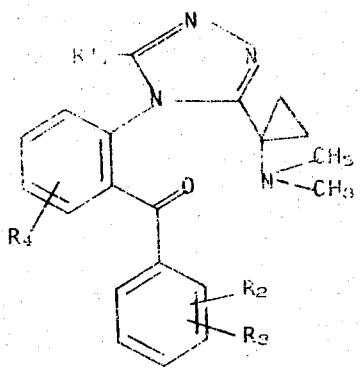

wherein R'₁ is hydrogen, methyl, (dimethylamino)-methyl;
wherein R₂ is hydrogen, chloro, or fluoro;
wherein R₃ is hydrogen or fluoro with the proviso that R₃ is not fluoro if R₂ is chloro; and wherein R₄ is hydrogen, chloro, fluoro, bromo, nitro, or trifluoromethyl, which comprises: treating a compound of formula I:

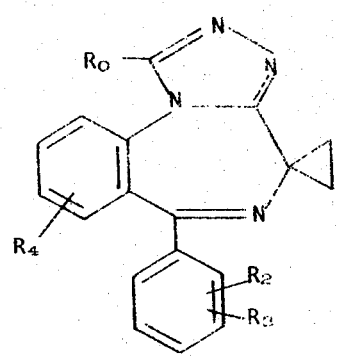

wherein R₂, R₃, and R₄ are defined as above, and R₀ is hydrogen, methyl, or (dimethylamino)methyl, with 2 equivalents of formaldehyde and formic acid to obtain a compound of formula II above.

13. A process for the production of a compound of the formula:

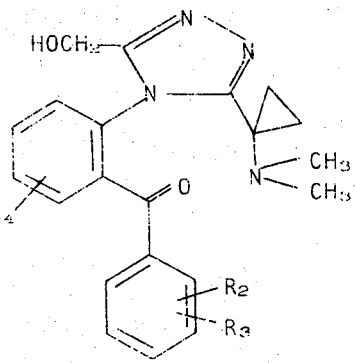

wherein R₂ is hydrogen, chloro, or fluoro; wherein R₃ is hydrogen or fluoro with the proviso that R₃ is not fluoro if R₂ is chloro; and wherein R₄ is hydrogen, chloro, fluoro, bromo, nitro, or trifluoromethyl, which comprises: treating a compound of formula:

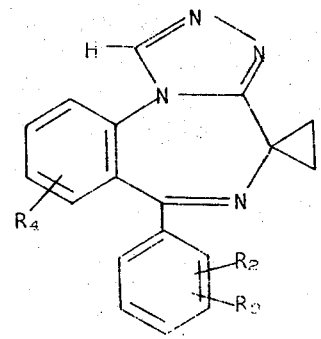

wherein R₂, R₃, and R₄ are defined as above, with three or more equivalents of formaldehyde in formic acid to obtain a compound of the formula above.

* * * * *